United States Patent
Houghton et al.

(10) Patent No.: US 9,391,962 B2
(45) Date of Patent: Jul. 12, 2016

(54) MULTI-NODE ENCRYPTION

(71) Applicants: Robert F. Houghton, Pocatello, ID (US); Jeffrey J. Johnson, Smithfield, UT (US)

(72) Inventors: Robert F. Houghton, Pocatello, ID (US); Jeffrey J. Johnson, Smithfield, UT (US)

(73) Assignee: Utah State University, North Logan, UT (US)

( * ) Notice: Subject to any disclaimer, the term of this patent is extended or adjusted under 35 U.S.C. 154(b) by 0 days.

(21) Appl. No.: 14/499,943

(22) Filed: Sep. 29, 2014

(65) Prior Publication Data

US 2016/0094523 A1 Mar. 31, 2016

(51) Int. Cl.
H04L 29/06 (2006.01)

(52) U.S. Cl.
CPC .......... H04L 63/0428 (2013.01); H04L 63/16 (2013.01)

(58) Field of Classification Search
CPC ........ H04L 9/08; H04L 63/0428; H04L 63/16
USPC ....................................................... 713/150
See application file for complete search history.

(56) References Cited

U.S. PATENT DOCUMENTS

| | | | | |
|---|---|---|---|---|
| 6,650,620 B1* | 11/2003 | Neogi | ............... | G06F 9/5044 370/231 |
| 6,829,709 B1* | 12/2004 | Acharya | ............... | H04L 63/164 370/338 |
| 7,360,084 B1* | 4/2008 | Hardjono | ............. | H04L 12/185 380/42 |
| 2005/0114675 A1 | 5/2005 | Ginzburg | | |

FOREIGN PATENT DOCUMENTS

WO       WO 0174004 A1       4/2001

OTHER PUBLICATIONS

Pearson K., Word history: Where does slang come from?, http://www.primary-sources.com/blog/2010/12/01/word-history-where-does-slang-come-from/ (Dec. 1, 2010), retrieved:Feb. 19, 2015.
Bushong A, Slang: How invented words become part of our language, http://www.bridgeenglish.com/slang-how-invented-words-become-part-of-our-language/ (Jan. 7, 2013), retrieved: Feb. 19, 2015.
Dey, S. et al., SD-Aree: A new modified caesar cipher cryptographic method along with bit-manipulation to exclude repetition from a message to be encrypted, arXiv preprint arXiv:1205.4279 (2012).
Gold, J. et al., Banburismus and the brain: decoding the relationship between sensory stimuli, decisions, and reward, 36(2) Neuron 299-308 (Oct. 10, 2002).

(Continued)

*Primary Examiner* — Kambiz Zand
*Assistant Examiner* — Aubrey Wyszynski

(57) ABSTRACT

For multi-node encryption, a method generates an upstream node nonce from communication data exchanged with an upstream node. In addition, the method generates a first upstream message transformation as a function of the upstream node nonce. The method further generates a tunnel transformation as a function of previous upstream message transformations and the first upstream message transformation.

14 Claims, 15 Drawing Sheets

(56) References Cited

OTHER PUBLICATIONS

Rakus-Andersson, E., The brains behind the enigma code breaking before the second world war. In Mathematics and War 83-102 (Jul. 29, 2003).

Davis, Ruth M., The Data Encryption Standard in Perspective, 16:6 Communications Society Magazine 5-9 (Nov. 1978) IEEE.

Arbaugh, William A. et al., Your 802.11 wireless network has no clothes. Wireless Communications, 9:6 Wireless Communications 44-51 (Mar. 30, 2001), IEEE.

Daemen, J. et al., The design of Rijndael: AES-the advanced encryption standard. (2002).

* cited by examiner

270

| Type 272 | Code 274 | Header Checksum 276 |
|---|---|---|
| Identifier 278 | | Sequence Number 280 |
| Original Timestamp 282 | | |
| Receive Timestamp 284 | | |
| Transmit Timestamp 286 | | |

305

| Type 272 | Code 274 | Header Checksum 276 |
|---|---|---|
| Identifier 278 | | Sequence Number 280 |
| Address 294 | | |
| Tunnel Transformation Index 310 | | |
| Secure Message 315 | | |

| Type 272 | Code 274 | Header Checksum 276 |
|---|---|---|
| Token 355 | | |

| Message Transformation 215 | Modification Nonce 325 | Transformation Modification 375 |
|---|---|---|
| Message Transformation 215 | Modification Nonce 325 | Transformation Modification 375 |
| Message Transformation 215 | Modification Nonce 325 | Transformation Modification 375 |
| Message Transformation 215 | Modification Nonce 325 | Transformation Modification 375 |

MULTI-NODE ENCRYPTION

FIELD

The subject matter disclosed herein relates to encryption and more particularly relates to multi-node encryption.

BACKGROUND

Description of the Related Art

Secure messages must be encrypted for communication over networks. Unfortunately, many traditional encryption methods are increasingly susceptible to being compromised.

BRIEF SUMMARY

A method for multi-node encryption is disclosed. The method generates an upstream node nonce from communication data exchanged with an upstream node. In addition, the method generates a first upstream message transformation as a function of the upstream node nonce. The method further generates a tunnel transformation as a function of previous upstream message transformations and the first upstream message transformation. A computer program product and an apparatus also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2E is a schematic block diagram illustrating one embodiment of a secure message packet;

FIG. 2F is a schematic block diagram illustrating one embodiment of a token packet;

DETAILED DESCRIPTION

Figure 1A:
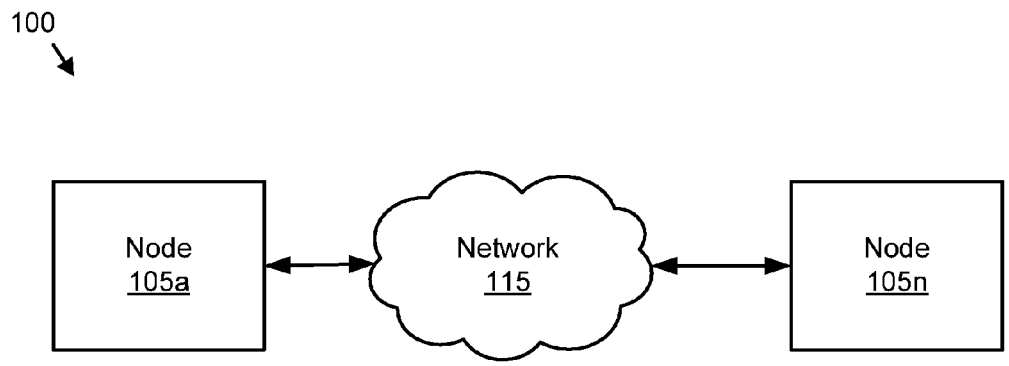
FIG. 1A is a schematic block diagram illustrating one embodiment of a communication system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a schematic block diagram illustrating one embodiment of a communication system 100. The system 100 communicates messages between nodes 105 over a network 115. The network 115 may be the Internet, a mobile telephone network, a wide-area network, a local area network, a wireless network, a satellite network, or combinations thereof.

Figure 1B:
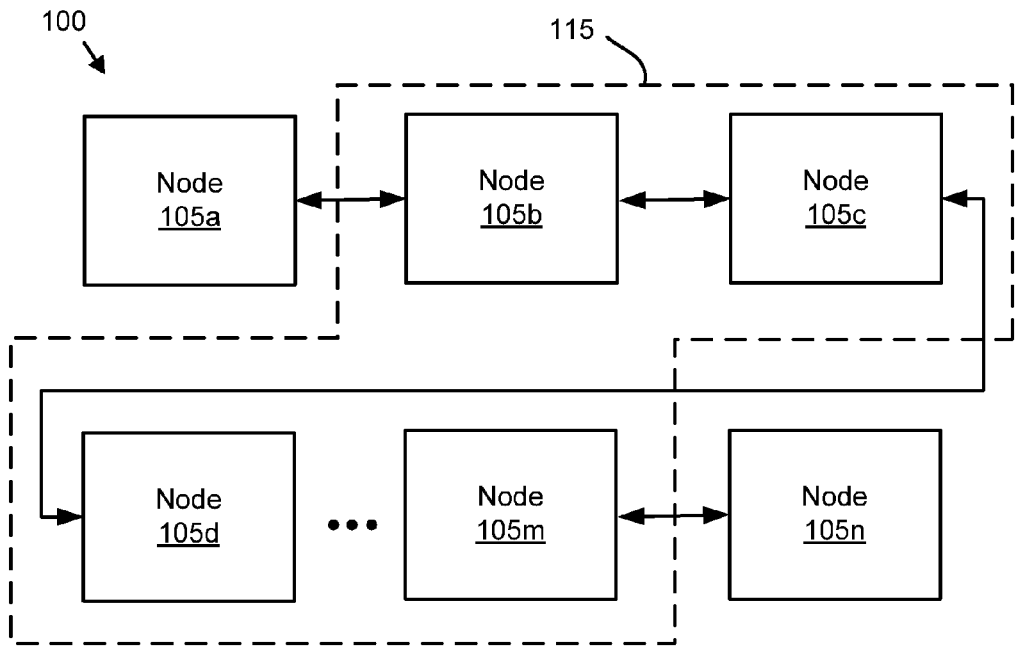
FIG. 1B is a schematic block diagram illustrating one alternate embodiment of a communication system.

FIG. 1B is a schematic block diagram illustrating one alternate embodiment of a communication system 100. The network 115 is depicted as a series of nodes 105. A secure message may be encapsulated in one or more packets and communicated from node 105 to node 105. In addition, some packets of the secure message may be routed through alternate nodes 105. For example, first packet may be routed through a first set of nodes 105, while a second packet may be routed through a second set of nodes 105.

Unfortunately, a message communicated over the network 115 may be intercepted at one or more nodes 105. As a result, many messages are encrypted. Symmetric encryption is often used, with very large keys being used to mathematically encrypt and decrypt messages. It has been infeasible to mathematically discover the keys and break the encryption. Another popular form of encryption is a use of public/private keys. Public keys are made publicly available and used to encrypt messages that may be communicated to the holder of the private key and decrypted with the private key. The public key and the private key share a complex mathematical relationship so that in the past it is been infeasible to determine the private key from the public key.

Unfortunately, advances in computer technology make it likely that many mathematical encryptions could be broken. For example, advanced computers may be able to discover secure keys from messages encrypted with large numbers by factoring the messages using Shor's algorithm.

The embodiments described herein generate a message transformation for securely communicating a secure message between two nodes 105. In addition, the embodiments generate a tunnel transformation as a function of multiple message transformations. As a result, the network 115 dynamically generates and modifies the transformations that encrypt of the secure message as the secure message is communicated as will be described hereafter.

Figure 2A:
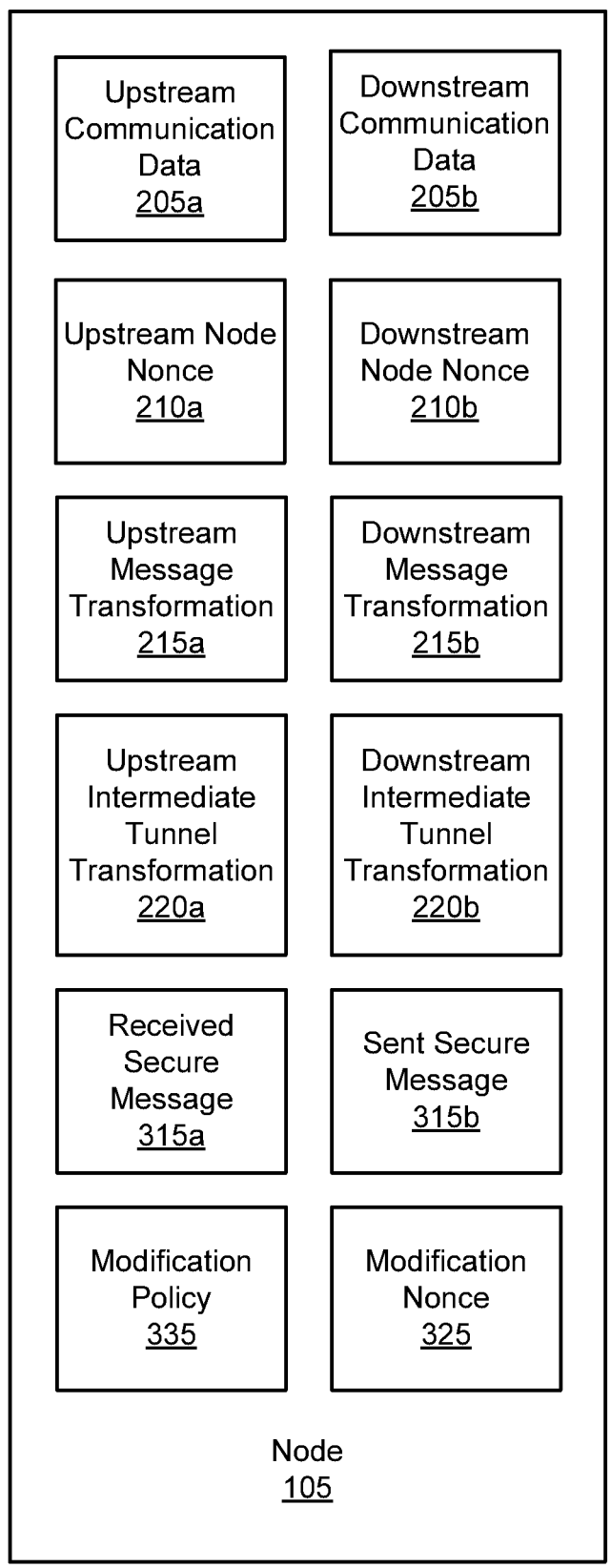
FIG. 2A is a schematic block diagram illustrating one embodiment of a node.

FIG. 2A is a schematic block diagram illustrating one embodiment of a node 105. In the depicted embodiment, the node 105 stores node data including upstream communication data 205a, downstream communication data 205b, an upstream node nonce 210a, a downstream node nonce 210b, an upstream message transformation 215a, downstream message transformation 215b, an upstream intermediate tunnel transformation 220a, and a downstream intermediate tunnel transformation 220b. In addition, the node data may include a received secure message 315a, a sent secure message 315b, a modification policy 335, and a modification nonce 325. The node data may be organized as one or more data structures and stored in a memory of the node 105.

In one embodiment, the node 105 exchanges the upstream communication data 205a with an upstream node 105. The received secure message 315a may be communicated from the upstream node 105 to the node 105. Nodes 105 may function as both upstream nodes 105 and downstream nodes 105 while communicating the secure message. The node 105 may further exchange the downstream communication data 205b with a downstream node 105.

The communication data 205 may include ICMP messages. In addition, the communication data 205 may include the received secure message 315a. The received secure message 315a may be encrypted at a source node 105 before being transmitted to a first downstream node 105. In addition, the received secure message 315a may be further encrypted by one or more nodes 105 in the network 115.

The node 105 may parse an upstream node nonce 210a from the upstream communication data 205a. In one embodiment, the upstream node nonce 210a is parsed from a specified portion of the received secure message 315a. For example, each node nonce 210 may be parsed from bytes 16 to 80 of the received secure message 315a. Alternatively, the node nonce 210 may be parsed from a specified field of the specified ICMP message as will be shown hereafter in FIG. 2D.

Because the upstream node 105 shares the upstream communication data 205a with the node 105, the upstream node 205 may also parse an identical node nonce 210 from the upstream communication data 205a and may store the node nonce 210 as a downstream node nonce 210b. The node 105 may generate the upstream message transformation 215a as a function of the upstream node nonce 210a. The upstream node 105 may also generate the message transformation 215, stored as a downstream message transformation 215b, as a function of the same node nonce 210.

The upstream node 105 may encrypt the received secure message 315a and other communications using the message transformation 215. The node 105 may decrypt and/or partially decrypt the received secure message 315a and the other communications using the same message transformation 215 or upstream message transformation 215a. The message transformation 215 provides secure communications between a node pair of the node 105 and the upstream node 105.

In addition, the node 105 may receive the upstream intermediate tunnel transformation 220a from the upstream node 105. The upstream intermediate tunnel transformation 220a may be encrypted with the upstream message transformation 215a. The upstream intermediate tunnel transformation 220a may comprise one or more message transformations 215 needed to decrypt the encrypted received secure message 315a. The upstream intermediate tunnel transformation 220a may be updated to include the upstream message transformation 215a. Alternatively, the upstream intermediate tunnel transformation 220a may not include the upstream message transformation 215a.

The node 105 may further exchange the downstream communication data 205b with the downstream node 105 and parse a downstream node nonce 210b from the downstream communication data 205b. The node 105 may generate the downstream message transformation 215b as a function of the downstream node nonce 210b and communicate securely with the downstream node 105 using the downstream message transformation 215b. In addition, the node 115 may encrypt the received secure message 315a with the downstream message transformation 215b to generate the sent secure message 315b and communicate the sent secure message 315b to the downstream node 105.

In addition, the node 105 may update the upstream intermediate tunnel transformation 220a with one of the upstream message transformation 215a and the downstream intermediate message transformation 215b and communicate the downstream intermediate tunnel transformation 220b to the downstream node 105.

Alternatively, the node 105 may receive a request for the upstream message transformation 210a from the downstream node 105. The node 105 may communicate the upstream message transformation 210a and/or an identifier for the upstream message transformation 210a encrypted with the downstream message transformation 210b to the downstream node 105. The downstream node 105 may communicate the encrypted upstream message transformation 210a forward to a destination node 105 that generates a tunnel transformation as will be described hereafter.

The modification policy 335 may include one or more criteria. When the modification policy 335 is satisfied, the node 105 may generate the modification nonce 325 and modify the upstream message transformation 215a or the downstream message transformation 215b as will be described hereafter.

Figure 2B:
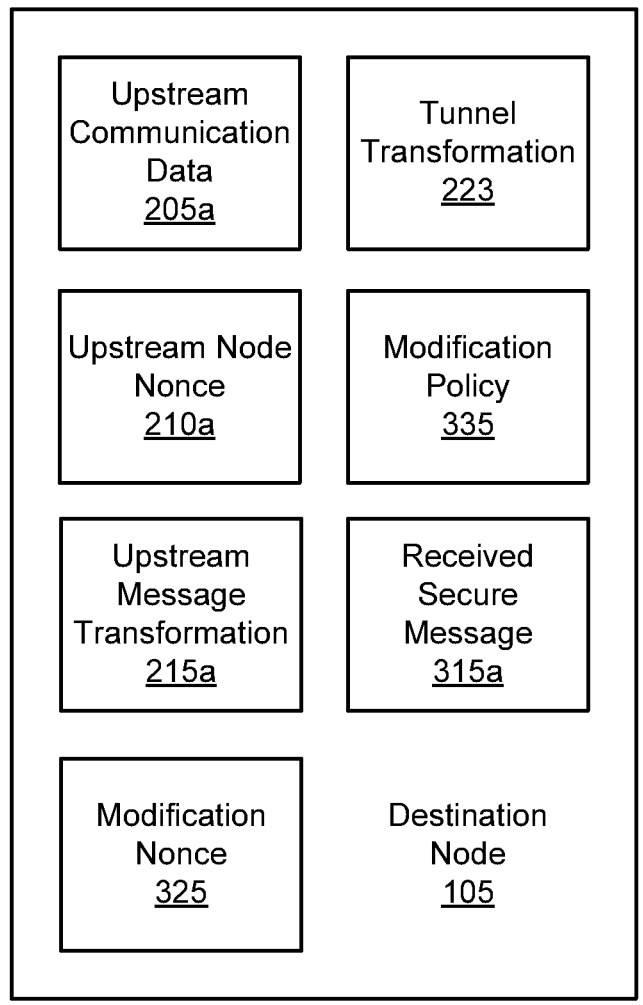
FIG. 2B is a schematic block diagram illustrating one embodiment of a destination node.

FIG. 2B is a schematic block diagram illustrating one embodiment of a destination node 105. The destination node 105 stores node data including the upstream communication data 205a, the upstream node nonce 210a, and the upstream message transformation 215a. The node data also includes at least one tunnel transformation 223. The tunnel transformations 223 may be generated from node data received from one or more upstream nodes 105. Each tunnel transformation 223 may specify one or more message transformations 215 required to decrypt a received secure message 315b. The destination node 105 may receive the received secure message 315b and decrypt the received secure message 315b using an appropriate tunnel transformation 223.

Figure 2C:
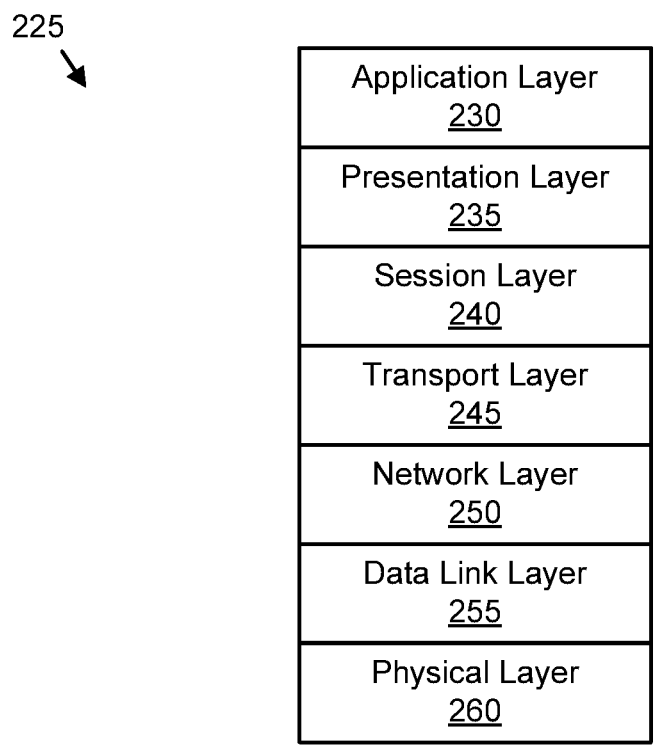
FIG. 2C is a schematic block diagram illustrating one embodiment of open system interconnection (OSI) layers.

FIG. 2C is a schematic block diagram illustrating one embodiment of OSI layers 225. Communications between the nodes 105 may be handled by the OSI layers 225. In the depicted embodiment, the OSI layers 225 include an application layer 230, a presentation layer 235, a session layer 240, a transport layer 245, a network layer 250, a data link layer 255, and the physical layer 260. The node nonce 210, message transformation 215, and intermediate tunnel transformation 220 may be generated on one of the OSI layers 225. For example, the node nonce 210, message transformation 215, and intermediate tunnel transformation 220 may be generated on the presentation layer 235. In addition, the received secure message 315a may be encoded with the downstream message transformation 215b on one of the OSI layers 225 such as the session layer 240.

Figure 2D:
FIG. 2D is a schematic block diagram illustrating one embodiment of an Internet control message protocol (ICMP) message.

FIG. 2D is a schematic block diagram illustrating one embodiment of an Internet control message protocol (ICMP) message 270. The ICMP message 270 may be communicated as a message between an upstream node 105 and a downstream node 105. In addition, the ICMP message 270 may be stored as communication data 205. In the depicted embodiment, an ICMP timestamp message 270 is shown. Other ICMP messages 270 may also be employed. The depicted ICMP timestamp message 270 includes a type 272, a code 274, a header checksum 276, an identifier 278, a sequence number 280, an original timestamp 282, a receive timestamp 284, and a transmit timestamp 286.

The type 272 may specify an ICMP message type. The code 274 may specify an ICMP message subtype. The header checksum 276 may include error correction data calculated from the ICMP message 270. The identifier 278 may be used to match a request with a reply. The sequence number 280 may also be used to match the request with the reply. The original timestamp 282 may record when the ICMP message 270 was originally transmitted. The receive timestamp 284 may record when the ICMP message 270 was received at the node 105. The transmit timestamp 286 may record when the ICMP message 270 was transmitted from the node 105.

The node nonce 210 may be selected from a specified portion of the ICMP message 270. The node nonce 210 may also be selected from portions of other ICMP message types and/or other messages.

In one embodiment, an upstream node 105 parses the node nonce 210 from a specified portion of the transmit timestamp 286. The downstream node 105 that receives the ICMP message 270 from the upstream node 105 may parse the node nonce 210 from the specified portion of the transmit timestamp 286. As a result, the node nonce 210 is based on communication data 205 known only to the upstream node 105 and the downstream node 105. The node nonce 210 may thus be an initial secret upon which secure communications between the nodes 105 may be based.

FIG. 2E is a schematic block diagram illustrating one embodiment of a secure message packet 305. The secure message packet 305 may include portions of the secure message 315. The secure message packet 305 may include a type 272, a code 274, a header checksum 276, an identifier 278, a sequence number 280, an address 294, a tunnel transformation index 310, and a portion of the secure message 315.

The address 294 may be an Internet protocol (IP) address. Alternatively, the address 294 may be a routing address.

The tunnel transformation index 310 may identify the tunnel transformation 223 that may be used to decrypt the secure message 315. If the secure message 315 is communicated through multiple paths of nodes 105, each path will generate a unique tunnel transformation 223. The tunnel transformation index 310 identifies the path and the corresponding tunnel transformation 223.

FIG. 2F is a schematic block diagram illustrating one embodiment of a token packet 350. The token packet 350 may include a type 272, a code 274, a header checksum 276, and a token 355. The token 355 may initiate secure communications between nodes 105.

Figure 3A:
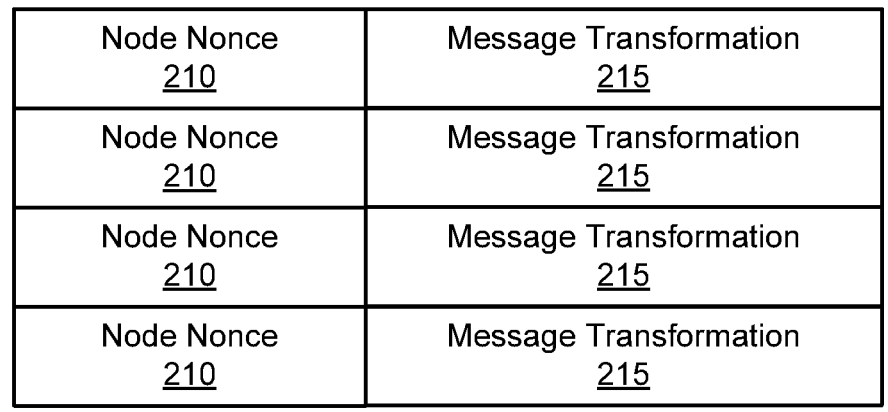
FIG. 3A is a schematic block diagram illustrating one embodiment of a message transformation table.

FIG. 3A is a schematic block diagram illustrating one embodiment of a message transformation table 300. The message transformation table 300 may be stored in a memory of the node 105. Alternatively, the message transformation table 300 may be stored remotely on a server. The message transformation table 300 may be organized as a data structure such as a database. In the depicted embodiment, the message transformation table 300 includes a plurality of node nonces 210 that each index a message transformation 215. In one embodiment, a message transformation 215 is generated by selecting the message transformation 215 corresponding to a node nonce 210. Each node 105 of a node pair may select the same message transformation 215 using the same node nonce 210.

Figure 3B:
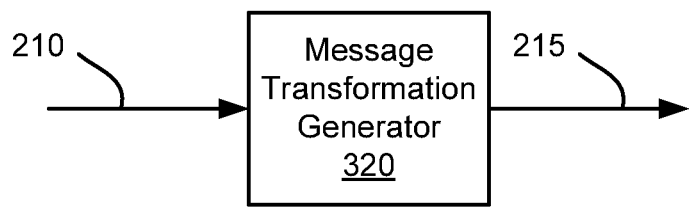
FIG. 3B is a schematic block diagram illustrating one embodiment of a message transformation generator.

FIG. 3B is a schematic block diagram illustrating one embodiment of a message transformation generator 320. The message transformation generator 320 may be an algorithm executed by each node 105 of a node pair. In one embodiment, the message transformation generator 320 uses the node nonce 210 as a seed to generate the message transformation 215. Because each node 105 of a node pair employs the same message transformation generator 320 and node nonce 210, the generated message transformation 215 is the same for each node 105.

Figure 3C:
FIG. 3C is a schematic block diagram illustrating one embodiment of a transformation modification table.

FIG. 3C is a schematic block diagram illustrating one embodiment of a transformation modification table 370. The transformation modification table 370 may be organized as a data structure in a memory. In one embodiment, transformation modification table 370 is indexed by a plurality of message transformations 215 and by a plurality of modification nonces 325. A transformation modification 375 may be selected from the table 370 as a function of the current message transformation 215 and the modification nonce 325.

In one embodiment, the modification nonce 325 is generated from the communication data 205 as will be described hereafter. Using the current message transformation 215 and the modification nonce 325, a transformation modification 375 may be selected from the table 340 and applied to the current message transformation 215. As a result, the encryption of the secure message 315 may be dynamically modified as will be described hereafter in FIG. 5B.

Figure 4:
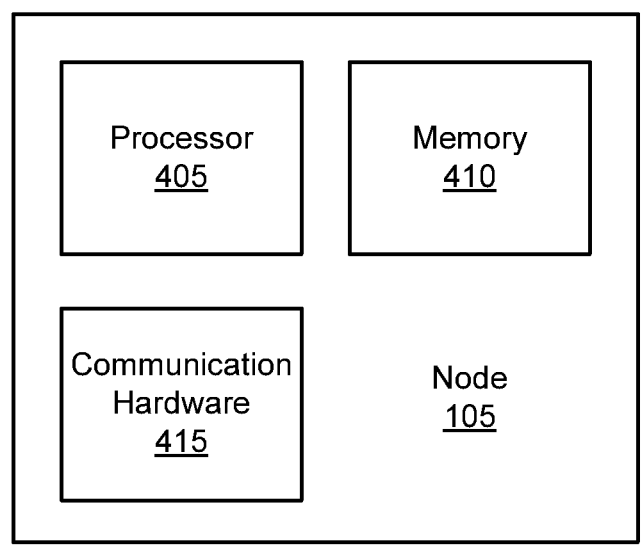
FIG. 4 is a schematic block diagram illustrating one embodiment of a node.

FIG. 4 is a schematic block diagram illustrating one embodiment of a node 105. The node includes a processor 405, a memory 410, and communication hardware 415. The memory 410 may be a computer readable storage medium including a semiconductor storage device, a hard disk drive, an optical storage device, a micromechanical storage device, and combinations thereof. The memory 410 may store code. The processor 405 may execute the code. The communication hardware 415 may communicate with other nodes 105 and/or other devices such as a server.

Figure 5A:
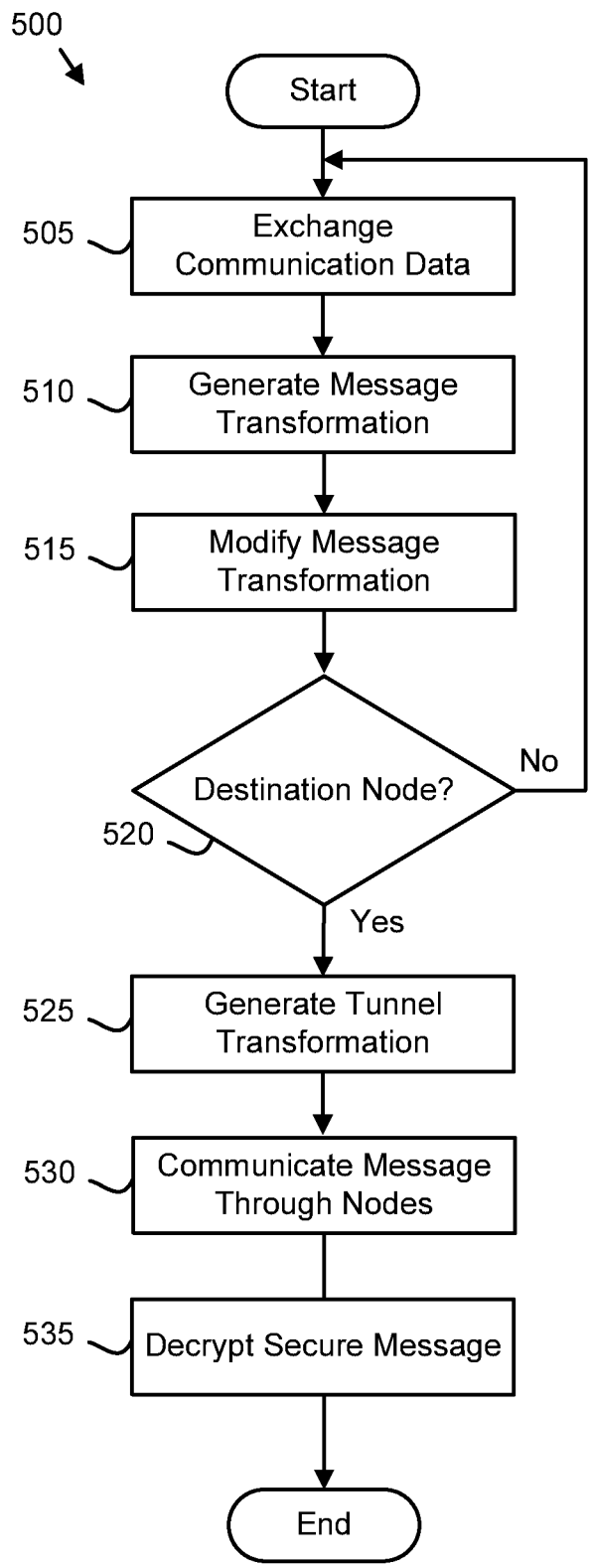
FIG. 5A is a schematic flow chart diagram illustrating one embodiment of a tunnel transformation generation method.

FIG. 5A is a schematic flow chart diagram illustrating one embodiment of a tunnel transformation generation method 500. The method 500 generates the tunnel transformation 223. In addition, the method 500 generates a secure tunnel between a source node 105 and a destination node 105. The method 500 may be performed by the processor 405. Alternatively, the method 500 may be performed by a computer readable storage medium such as the memory 410. The computer readable storage media may store code executable by the processor 405 to perform the functions of the method 500.

The method 500 starts, and in one embodiment, the node 105 exchanges 505 communication data 205 with another node 105. The other node 105 may be an upstream node 105 or downstream node 105.

The node 105 further generates 510 a message transformation 215. The generation 510 of the message transformation 215 is described in greater detail for FIGS. 5B and 5C. The message transformation 215 may be used to securely communicate between the node 105 and the other node 105 as a node pair.

In one embodiment, the node pair modifies 515 the transformation message 215. In one embodiment, the node pair modifies 515 the transformation message in response to the communication data 205 satisfying the modification policy 335. The modification 515 of the message transformation 215 is described in more detail for FIG. 5E.

The node 105 may determine if the node 105 is a destination node 105. In one embodiment, if the address 294 of a secure message packet 305 is the address of the node 105, the node 105 is the destination node 105. If the node 105 is not the destination node 105, the node 105 continues to exchange 505 communication data 205, generate 510 message transformations 215, and modify 315 message transformations 215 until the current node 105 is the destination node 105.

If the node 105 is the destination node 105, the node 105 generates 525 the tunnel transformation 223. One embodiment of the generation 525 of the tunnel transformation 223 is described in greater detail for FIGS. 5B-C. In an alternate embodiment of generating 525 the tunnel transformation 223 is described in FIG. 5D.

Secure messages 315 are communicated 530 from the source node 105 to the destination node 105. The destination node 105 uses the tunnel transformation 223 to decrypt 535 the received secure messages 315a that are communicated through the nodes 105 of the network 115. The communication 530 and decryption 535 of the secure message 315 is described in more detail for FIG. 5F.

Figure 5B:
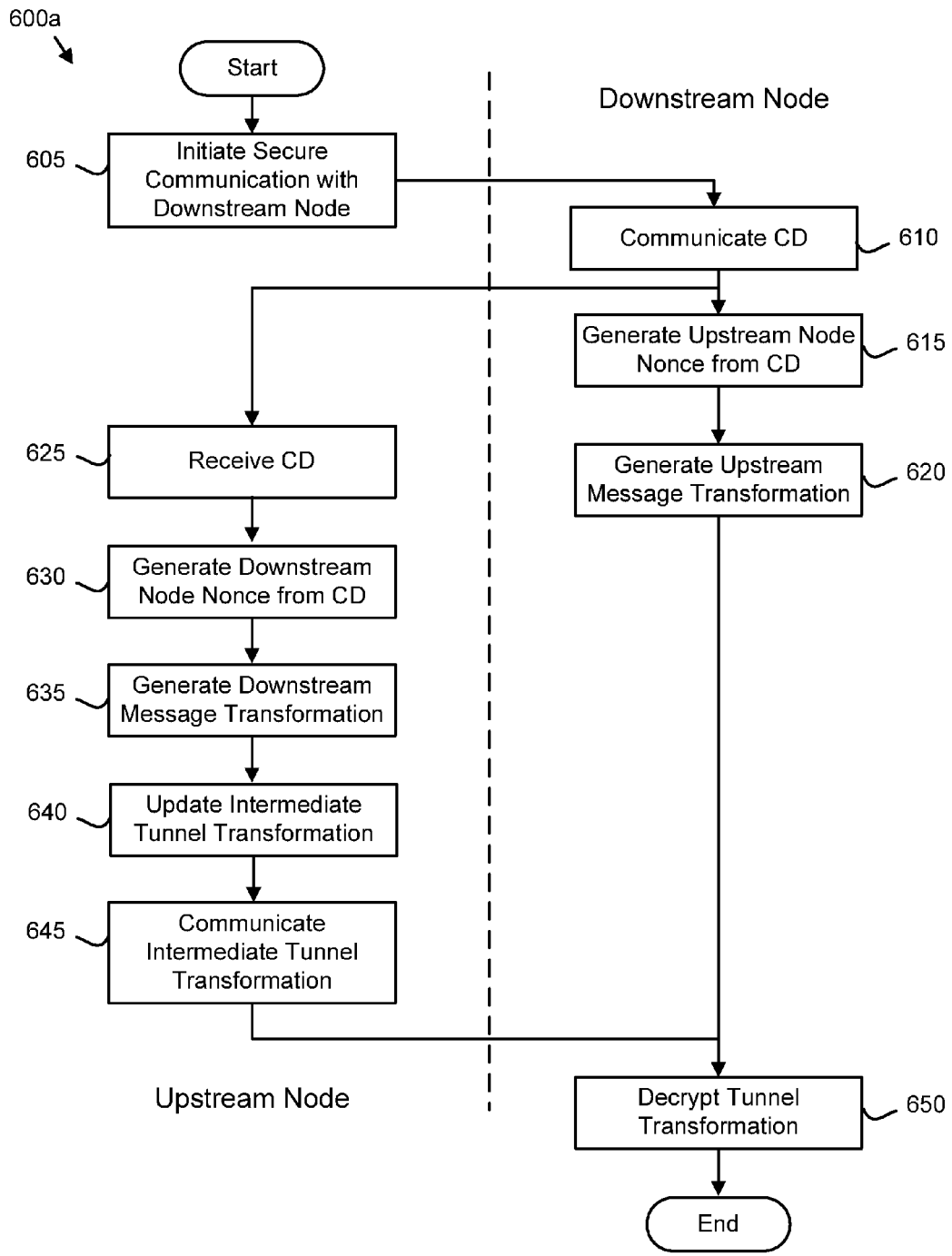
FIG. 5B is a schematic flow chart diagram illustrating one embodiment of a node to node transformation generation method.

FIG. 5B is a schematic flow chart diagram illustrating one embodiment of a node to node transformation generation method 600a. The method 600a generates the message transformation 215 and the downstream intermediate tunnel transformation 220b. The method 600a may be performed by the processor 405. Alternatively, the method 600a may be performed by a computer readable storage medium such as the memory 410. The computer readable storage media may store code executable by the processor 405 to perform the functions of the method 600a.

The depicted steps of the method 600a are divided between the upstream node 105 and the downstream node 105. The method 600a starts, and in one embodiment, the upstream node 105 initiates 605 secure communication with the downstream node 105. In one embodiment, the upstream node 105 initiates 605 secure communication by communicating the token 355. The token 355 may indicate that the node pair should initiate 605 secure communications.

Alternatively, the upstream node 105 may initiate 605 secure communications with the downstream node 105 using port knocking. The upstream node 105 may communicate a message to two or more specified ports of the downstream node 105 to initiate 605 secure communication. In addition, the upstream node 105 may communicate the message to the two or more specified ports in a specified order to initiate 605 secure communications.

The downstream node 105 may communicate 610 communication data 205 with the upstream node 105. The downstream node 105 may initiate the communication 610. Alternatively, the upstream node 105 may initiate the communication 610. The communication 610 may be in response to the upstream node 105 initiating 605 the secure communication.

The downstream node 105 may further generate 615 the upstream node nonce 210a from the communication data 205. The upstream node nonce 210a may be generated in response to the upstream node 105 initiating 605 secure communications. In one embodiment, the upstream node nonce 210a is generated 615 by extracting specified bytes from the communication data 205. For example, the downstream node 205 may extract the first six bytes of the transmit timestamp 286 of the ICMP message 270.

In one embodiment, the upstream node nonce 210a may be hashed using the hashing algorithm. In addition, the upstream node nonce 210a may be deterministically hashed to one of a specified hash number of values. For example, each upstream node nonce 210a may have one of 1,048,576 values.

In addition, the downstream node 105 may generate 620 the upstream message transformation 215a as a function of the upstream node nonce 210a. In one embodiment, the upstream node nonce 210a may identify an upstream message transformation 215a from a message transformation table 300. The upstream node nonce 210a may be used as an index to the message transformation table 300 to retrieve the message transformation 215. The message transformation 215 may be a transformation algorithm of a message transformation generator 320.

Alternatively, the upstream node nonce 210a may be an input to a message transformation generator 320. For example, the upstream node nonce 210a may be a seed input for the message transformation generator 320. The message transformation generator 320 may generate 620 an upstream message transformation 215a from the upstream node nonce 210a.

The upstream node 105 may receive 625 the communication data 205. In addition, the upstream node 105 may generate 630 the downstream node nonce 210b from the communication data 205. The downstream node nonce 210b may be generated in response to the upstream node 105 initiating 605 secure communications. In addition, the downstream node nonce 210b may be generated 630 identically to the upstream node nonce 210a. In one embodiment, the downstream node nonce 210b is generated 630 by extracting specified bytes from the communication data 205. For example, the upstream node 205 may also extract the first six bytes of the transmit timestamp 286 of the ICMP message 270.

In one embodiment, the downstream node nonce 210b may be hashed using the hashing algorithm. In addition, the downstream node nonce 210b may be deterministically hashed to one of a specified hash number of values. For example, each downstream node nonce 210b may also have one of 1,048,576 values. In one embodiment, the hash number of values is in the range of 1,000 to 10,000,000.

In one embodiment, the upstream node 105 may generate 635 the downstream message transformation 215b as a function of the downstream node nonce 210b. The downstream node nonce 210b may identify a downstream message transformation 215b from a message transformation table 300. The downstream node nonce 210b may be used as an index to the message transformation table 300 to retrieve the message transformation 215. The message transformation 215 may be a transformation algorithm of the message transformation generator 320.

Alternatively, the downstream node nonce 210b may be an input to a message transformation generator 320. For example, the downstream node nonce 210b may be a seed input for the message transformation generator 320. The message transformation generator 320 may generate 635 a downstream message transformation 215b from the downstream node nonce 210b.

In one embodiment, the upstream node 105 updates 640 the upstream intermediate tunnel transformation 220a with the downstream message transformation 215b to generate the downstream intermediate tunnel transformation 220b. The upstream intermediate tunnel transformation 220a may include information for decrypting the received secure message 315a. The downstream intermediate message tunnel transformation 220b may include information for decrypting the sent secure message 315b encrypted with the downstream message transformation 215b.

The upstream node 105 may communicate 645 the downstream intermediate tunnel transformation 220b to the downstream node 105. In one embodiment, the communicated intermediate tunnel transformation 220 is encrypted with the downstream message transformation 215b.

The downstream node 105 may decrypt 650 the downstream intermediate tunnel transformation 220b and the method 600a ends. The downstream intermediate tunnel transformation 220b may be communicated forward to the destination node 105 and used to generate the tunnel transformation 223 for secure communications to the destination node 105. In one embodiment, the downstream intermediate tunnel transformation 220b received at the destination node 105 is the tunnel transformation 223.

Figure 5C:
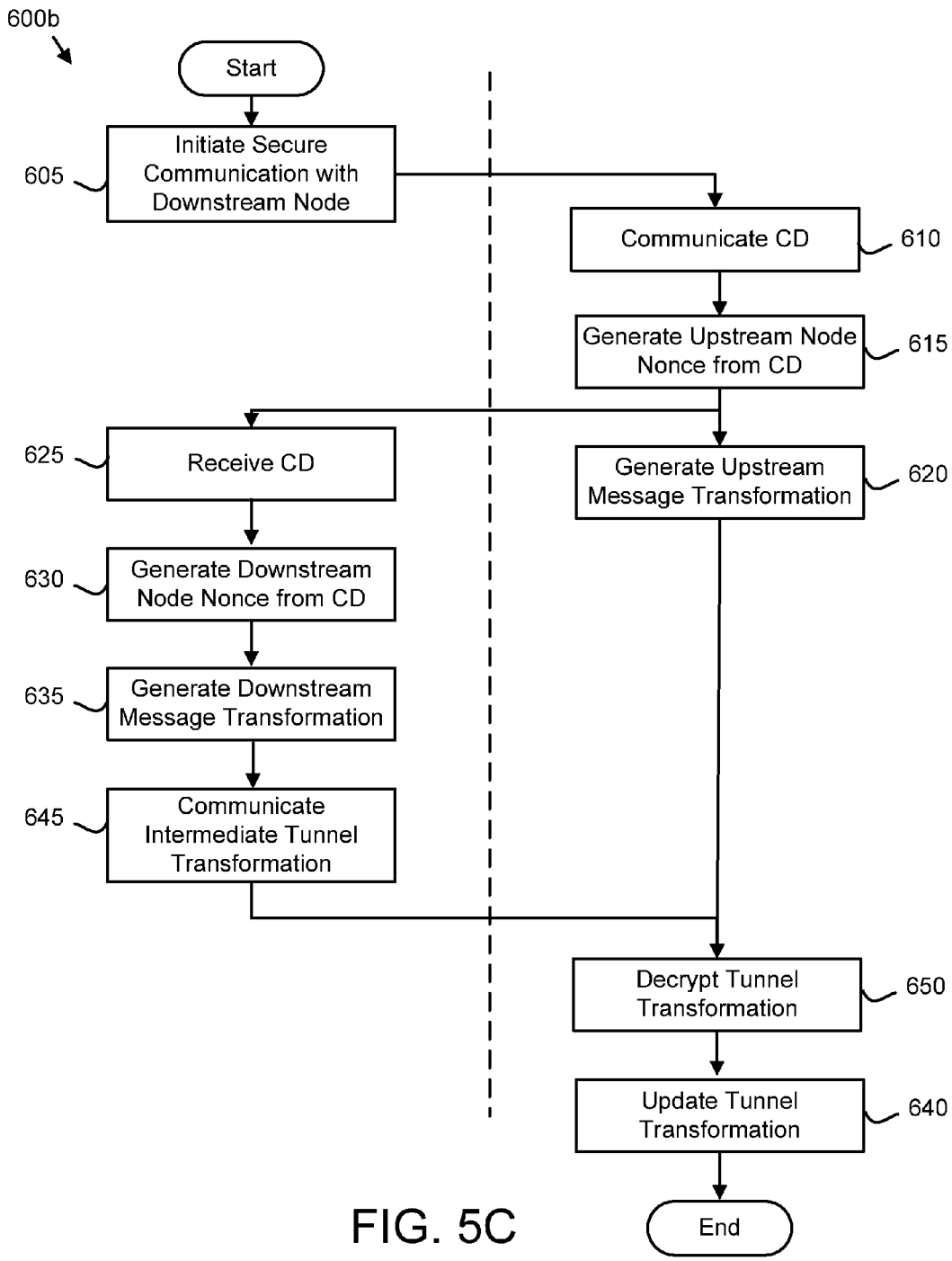
FIG. 5C is a schematic flow chart diagram illustrating one alternate embodiment of a node to node transformation generation method.

FIG. 5C is a schematic flow chart diagram illustrating one alternate embodiment of a node to node transformation generation method 600b. The method 600b generates the message transformation 215 and the downstream intermediate tunnel transformation 220b. The method 600b may be performed by the processor 405. Alternatively, the method 600b may be performed by a computer readable storage medium such as the memory 410. The computer readable storage media may store code executable by the processor 405 to perform the functions of the method 600b.

The method 600b performs the steps of FIG. 5B. However, the upstream node 105 does not update 640 the upstream intermediate tunnel transformation 220a to generate the downstream intermediate tunnel transformation 220b. Instead, the upstream intermediate tunnel transformation 220a encrypted with the downstream message transformation 210b is communicated 645 from the upstream node 105 to the downstream node 105. The downstream node 105 decrypts 650 the upstream intermediate tunnel transformation 220a received from the upstream node 105 to generate the upstream intermediate tunnel transformation 220a of the upstream node 105 and updates 640 the upstream intermediate tunnel transformation 220a of the upstream node 105 with the upstream message transformation 215a to generate the downstream intermediate tunnel transformation 220b. In one embodiment, the downstream intermediate tunnel transformation 220b received by the destination node 105 is the tunnel transformation 223.

The methods 600 of FIGS. 5B-C generate the downstream node nonce 210b and downstream message transformation 215b at the upstream node 105 while generating the upstream node nonce 210a and the upstream message transformation 215a at the downstream node 105. In addition, the methods 600 update the upstream intermediate tunnel transformation 220a of the upstream node 105 with the message transformation 215 to generate the downstream intermediate tunnel transformation 220b of the downstream node 105 and the tunnel transformation 223 of the destination node 105.

Figure 5D:
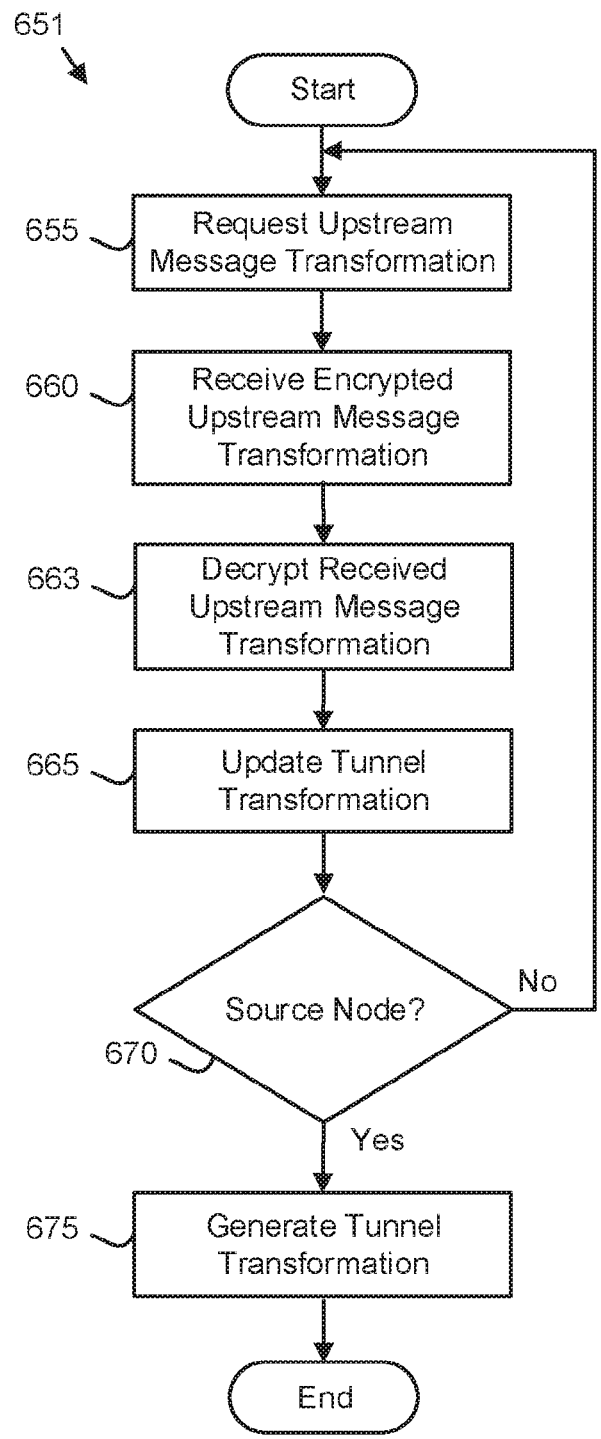
FIG. 5D is a schematic flow chart diagram illustrating one alternate embodiment of a node to node transformation generation method.

FIG. 5D is a schematic flow chart diagram illustrating one alternate embodiment of a node to node transformation generation method 651. The method 651 generates the tunnel transformation from the destination node 105. The method 651 may be performed by a processor 405. Alternatively, the method 651 may be performed by a computer readable storage medium such as the memory 410 storing code. The code may be executed by the processor 405 to perform the method 651.

The destination node 105 may request 655 the upstream message transformation 210a of an upstream node 105. The upstream node 105 may be in direct communication with the destination node 105 or several hops removed from the destination node 105. In one embodiment, the upstream node 105 is a node for which the destination node 105 has previously received and/or generated an upstream message transformation 210a/downstream message transformation 210b. For example, the destination node 105 may initially request 655 the upstream message transformation 210a from an immediate upstream node 105 for which the destination node 105 has a downstream message transformation 210b for secure communications.

Using the upstream message transformation 210a of the first upstream node 105, the destination node 105 may request 655 the upstream message transformation 210a of a second upstream message node 105 that is upstream of the first upstream node 105. As a result, the destination node 105 requests 655 the upstream message transformation 210a of each upstream node 105 in the network 115 working backwards to the source node 105.

The destination node 105 may further receive 660 the upstream message transformation 210a of the upstream node 105 encrypted with the downstream message transformation 210b of the upstream node 105. In addition, the upstream message transformation 210a of the upstream node 105 may also be encrypted with the downstream message transformations of one or more intermediate nodes 105.

In one embodiment, the destination node 105 decrypts 663 the received upstream message transformation 210a using one or more previously received upstream message transformations 210a/downstream message transformations 210b. The destination node 105 may update 665 the tunnel transformation 223 with the received and/or decrypted upstream message transformation 210a. The upstream message transformation 210a from the first upstream node 105 may be an initial tunnel transformation 223. The tunnel transformation 223 may be updated 665 with subsequent upstream message transformations 210a/downstream message transformations 210b.

The destination node 105 further determines 670 if the upstream node 105 from which the upstream message transformation 210a is received is the source node 105. If the upstream node 105 is not the source node 105, the destination node 105 continues to request 655 upstream message transformations 210a.

If the upstream node 105 is the source node 105, the destination node 105 generates 675 the tunnel transformation 223 and the method 651 ends. The tunnel transformation 223 may be a function of each upstream message transformation 210a of each node 105 in the path through the network 115. In one embodiment, a received secure message 315a encrypted with each upstream message transformation 210a may be decrypted using the tunnel transformation 223.

The destination node 105 may further generate the tunnel transformation index 310 as part of the tunnel transformation 223. The tunnel transformation index 310 may be used to determine when to apply the tunnel transformation 223 to a received secure message 315a.

Figure 5E:
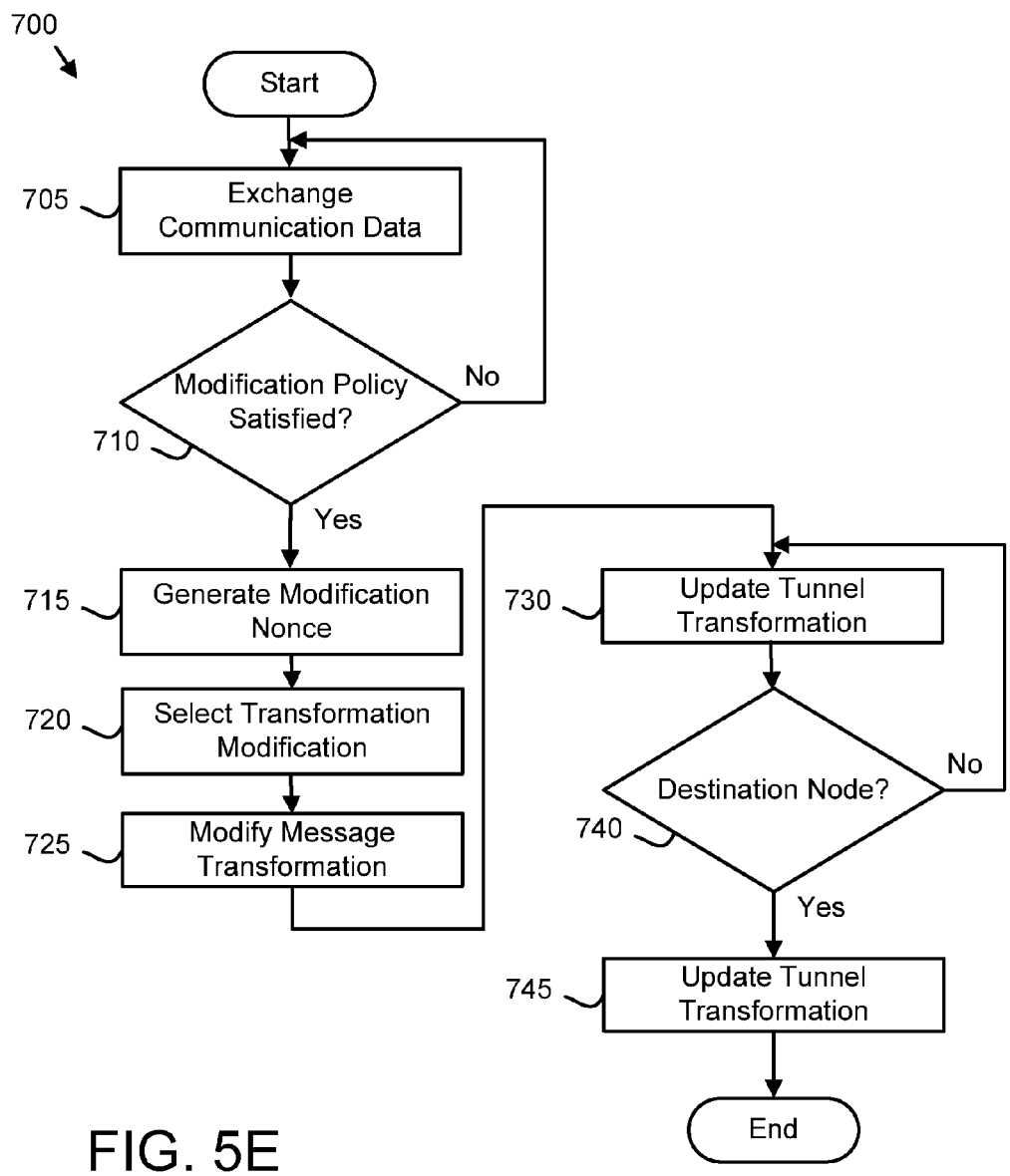
FIG. 5E is a schematic flow chart diagram illustrating one embodiment of a secure message communication method.

FIG. 5E is a schematic flow chart diagram illustrating one embodiment of a transformation modification method 700. The method 700 may dynamically modify the message transformation 215 during communications between an upstream node 105/downstream node 105 node pair. The method 700 may be performed by a processor 405. Alternatively, the method 700 may be performed by a computer readable storage medium such as the memory 410 storing code. The code may be executed by the processor 405 to perform the method 700.

The method 700 starts, and in one embodiment, either the upstream node 105 or the downstream node 105, referred to hereafter as the first node 105, exchanges 705 communication data 205 with another node 105. The communication data 205 may include portions of the encrypted message 365. In addition, the communication data 205 may include an ICMP message 270.

The first node 105 may determine 710 if the modification policy 335 is satisfied. In one embodiment, the modification policy 335 is satisfied if a specified quantity of the encrypted message 365 has been communicated between nodes 105. For example, the modification policy 335 may be satisfied if one megabyte (MB) of the encrypted message has been communicated between the nodes 105. In one embodiment, the specified quantity of the encrypted message 365 is in the range of 500 kilobytes to 500 MB.

Alternatively, the modification policy 335 may be satisfied if a specified modification phrase is communicated in a specified field of the communication data 205. For example, the modification policy 335 may be satisfied if a portion of the transmit timestamp 286 of the ICMP message 270 has a specified modification phrase.

If the modification policy 335 is not satisfied, the first node 105 continues to exchange the communication data 205 with the other node 105. If the modification policy 335 is satisfied, the first node 105 generates 715 a modification nonce 325 from the communication data 205. In one embodiment, the modification nonce 325 is parsed from a specified portion of the communication data 205 such as a field of the ICMP message 270. In addition, the specified portion of the communication data 205 may be hashed using the hashing algorithm to generate the modification nonce 325.

The first node 105 may further select 720 a transformation modification 375 from the transformation modification table 370 using the modification nonce 325 and the message transformation 215. The transformation modification 375 may specify that a new message transformation 215 be used.

In one embodiment, the encryption module 455 employs the modification nonce 325 as an index to select 720 the new message transformation 215 from the message transformation table 300. The new message transformation 215 may be different from the current message transformation 215.

In one embodiment, the first node 105 modifies 725 the message transformation 215 in response to the transformation modification 375. The first node 105 may modify the message transformation 215 for all portions of the secure message 315 communicated a specified modification time interval after the modification phrase. The modification time interval may be in the range of 10 to 40 milliseconds. Alternatively, the first node 105 may modify the message transformation 215 for all portions of the secure message 315 communicated after the modification phrase.

In one embodiment, the first node 105 replaces the current message transformation 215 with a new message transformation 215 as directed by the transformation modification 375 to modify 725 the message transformation 215. Alternatively, the first node 105 may modify 725 the message transformation 215 as directed by the transformation modification 375.

The first node 105 may further update 730 the tunnel transformation 223 by updating the upstream intermediate tunnel transformation 220a as directed by the transformation modification 375 to generate the downstream intermediate tunnel transformation 220b. In addition, the first node 105 may communicate the updated downstream intermediate tunnel transformation 220b to a next first node 105.

If the next first node 105 determines 740 that the next first node 105 is not the destination node 105, the next first node 105 may also update 730 the upstream intermediate tunnel transformation 220a to generate the downstream intermediate tunnel transformation 220b and communicate the updated downstream intermediate tunnel transformation 220b to the next first node 105.

If the next first node 105 is the destination node 105, the destination node 105 may update 745 the tunnel transformation 223 with the updated downstream intermediate tunnel transformation 220b and the method 700 ends. The destination node 105 may replace the tunnel transformation 223 with the updated downstream intermediate tunnel transformation 220b. In addition, the destination node 105 may update the tunnel transformation index 310. By modifying the message transformation 215 during the transmission of the secure message 315, the method 700 makes the unauthorized decryption of the secure message 315 more difficult.

Alternatively, the first node 105 may update 730 the tunnel transformation 223 by communicating a modification message to the next first node 105 until the next first node 105 is determined 740 to be the destination node 105. The destination node 105 may update 745 the tunnel transformation 223 as described in FIG. 5D.

Figure 5F:
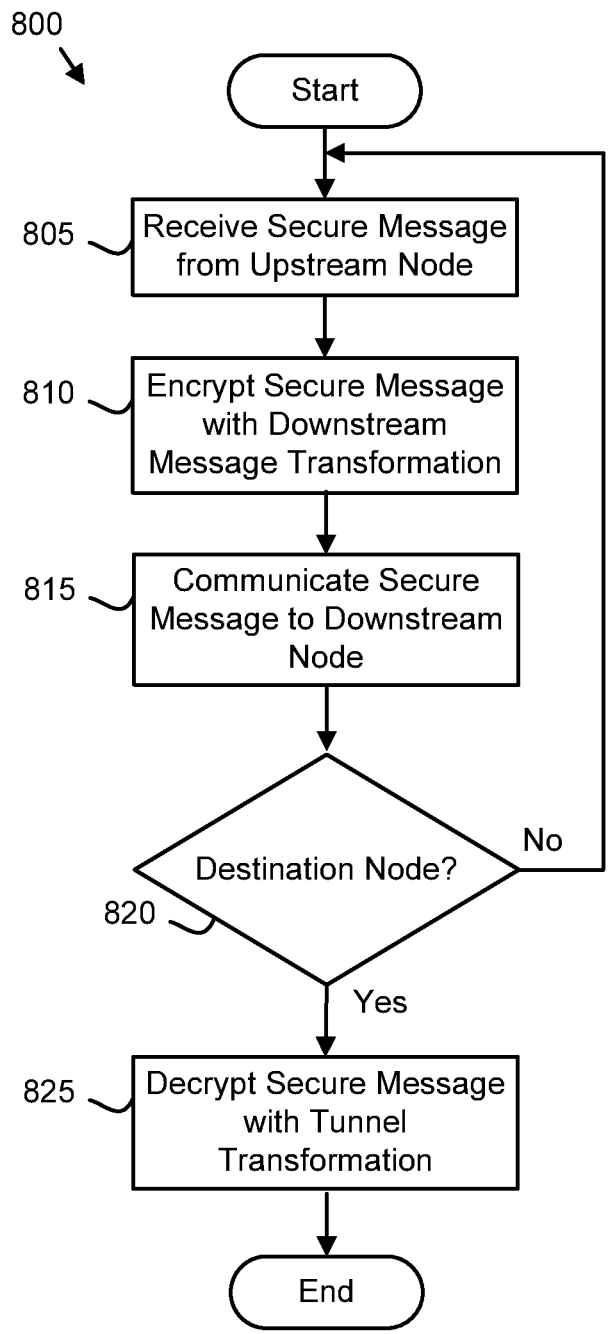
FIG. 5F is a schematic flow chart diagram illustrating one embodiment of a secure message communication method.

FIG. 5F is a schematic flow chart diagram illustrating one embodiment of a secure message communication method 800. The method 800 may communicate the secure message 315 from a source node 105 to the destination node 105. The method 800 may be performed by the processor 405. Alternatively, the method 500 may be performed by a computer readable storage medium such as the memory 410. The computer readable storage media may store code executable by the processor 405 to perform the functions of the method 800.

The method 800 starts, and in one embodiment, a first node 105 receives 805 the received secure message 315a from an upstream node 105. The received secure message 315a is encrypted with the upstream message transformation 215a.

The first node 105 further encrypts 810 the received secure message 315a with the downstream message transformation 215b to generate the sent secure message 315b. In addition, the node 105 communicates 815 the sent secure message 315b to a downstream node 105.

The downstream node 105 determines 820 if the downstream node 105 is the destination node 105. If the downstream node 105 is not the destination node 105, the downstream node 105 receives 805 the secure message 315 as the first node 105 and encrypts 810 and communicates 815 a secure message 315. If the downstream node 105 is the destination node 105, the destination node 105 decrypts 825 the received secure message 315a using the tunnel transformation 223 and the method 800 ends.

In one embodiment, the destination node 105 may select the tunnel transformation 223 used to decrypt 825 the received secure message 315a using the tunnel transformation index 310. As a result, secure messages 315 may follow multiple paths through the network 115 and be encrypted with multiple message transformations 215. The destination node 105 determines the appropriate tunnel transformation 223 for each path and decrypts the secure message 315 using the appropriate tunnel transformation 223.

The embodiments generate a message transformation 215 for securely communicating the secure message 315 between two nodes 105. In addition, the embodiments generate the tunnel transformation 223 as a function of multiple message transformations 215 for a path through the network 115. As a result, the network 115 dynamically generates the message transformations 215 that encrypt the secure message 315.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
communicating an Internet control message protocol (ICMP) message from a first upstream node to a first downstream node in response to the first upstream node initiating a secure communication with the first downstream node;
generating, by use of a processor, a downstream node nonce from the ICMP message exchanged with the first downstream node;
generating a first downstream message transformation as a function of the downstream node nonce, wherein the downstream node nonce is an input to a message transformation generator;
receiving a request encrypted with the first downstream message transformation through the first downstream node from a destination node that is downstream of the first downstream node, wherein the request is for an upstream message transformation that is shared between the first upstream node and a second upstream node that is upstream of the first upstream node;
communicating the upstream message transformation encrypted with the first downstream message transformation through the first downstream node to the destination node in response to the request; and
generating a tunnel transformation at the destination node as a function of one or more upstream message transformations and the first downstream message transformation.

2. The method of claim 1, wherein the downstream node nonce further identifies the first downstream message transformation from a message transformation table.

3. The method of claim 1, wherein the first upstream node initiates secure communication by communicating a token.

4. The method of claim 1, wherein the first upstream node initiates secure communication through port knocking.

5. The method of claim 1, wherein the first downstream message transformation and the tunnel transformation are generated on an open system interconnection (OSI) layer.

6. The method of claim 1, wherein a source node communicates with the destination node through a plurality of paths, each of the plurality of paths has a unique tunnel transformation, and the method further comprises generating a tunnel transformation index that determines when to apply each tunnel transformation to a received secure message.

7. A program product comprising a non-transitory computer readable storage medium that stores code executable by a processor, the executable code comprising code to perform:
communicating an Internet control message protocol (ICMP) message from a first upstream node to a first downstream node in response to the first upstream node initiating a secure communication with the first downstream node;
generating a downstream node nonce from the ICMP message exchanged with the first downstream node;
generating a first downstream message transformation as a function of the downstream node nonce, wherein the downstream nonce node is an input to a message transformation generator;
receiving a request encrypted with the first downstream message transformation through the first downstream node from a destination node that is downstream of the first downstream node, wherein the request is for an upstream message transformation that is shared between the first upstream node and a second upstream node that is upstream of the first upstream node;
communicating the upstream message transformation encrypted with the first downstream message transformation through the first downstream node to the destination node in response to the request; and
generating a tunnel transformation at the destination node as a function of one or more upstream message transformations and the first downstream message transformation.

8. The program product of claim 7, wherein the downstream node nonce further identifies the first downstream message transformation from a message transformation table.

9. The program product of claim 7, wherein the first upstream node initiates secure communication by one or more of communicating a token and port knocking.

10. The program product of claim 7, wherein a source node communicates with the destination node through a plurality of paths, each of the plurality of paths has a unique tunnel transformation, and the executable code further generates a tunnel transformation index that determines when to apply each tunnel transformation to a received secure message.

11. An apparatus comprising:
a processor;
a memory that stores code executable by the processor to:
communicate an Internet control message protocol (ICMP) message from a first upstream node to a first downstream node in response to the first upstream node initiating a secure communication with the first downstream node;
generate a downstream node nonce from the ICMP message exchanged with the first downstream node;

generate a first downstream message transformation as a function of the downstream node nonce, wherein the downstream nonce node is an input to a message transformation generator;

receiving a request encrypted with the first downstream message transformation through the first downstream node from a destination node that is downstream of the first downstream node, wherein the request is for an upstream message transformation that is shared between the first upstream node and a second upstream node that is upstream of the first upstream node;

communicate the upstream message transformation encrypted with the first downstream message transformation through the first downstream node to the destination node in response to the request; and generate a tunnel transformation at the destination node as a function of one or more upstream message transformations and the first downstream message transformation.

12. The apparatus of claim 11, wherein the downstream node nonce further identifies the first downstream message transformation from a message transformation table.

13. The apparatus of claim 11, wherein the first upstream node initiates secure communication by one or more of communicating a token and port knocking.

14. The apparatus of claim 11, wherein a source node communicates with the destination node through a plurality of paths, each of the plurality of paths has a unique tunnel transformation, and the processor further generates a tunnel transformation index that determines when to apply each tunnel transformation to a received secure message.

* * * * *